United States Patent Office 3,041,366
Patented June 26, 1962

3,041,366
O-(1-ALKYNYLCYCLOALKYL) O,O-DIALKYL PHOSPHATES AND PHOSPHOROTHIOATES
Herman O. Senkbeil, Midland, Mich., assignor to The Dow Chemical Company, Midland, Mich., a corporation of Delaware
No Drawing. Filed July 6, 1961, Ser. No. 122,101
7 Claims. (Cl. 260—461)

The present invention is directed to the phosphates and phosphorothioates corresponding to the formula:

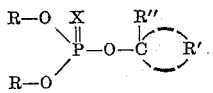

In this and succeeding formulae, each R represents lower alkyl, R' represents a polymethylene radical containing from 4 to 5 carbon atoms, inclusive, R" represents ethynyl or 1-propynyl and X represents oxygen or sulfur. In the present specification and claims, the expression "lower alkyl" is employed to refer to the alkyl radicals containing from 1 to 5 carbon atoms, inclusive. These compounds are liquid materials which are somewhat soluble in many common organic solvents and of very low solubility in water. The compounds are useful as herbicides and parasiticides and are adapted to be employed for the control of many plants, mites, insects and bacterial and fungal organisms such as aphids, worms, flies and Setaria italica.

The novel compounds of the present invention are prepared by reacting an O,O-dialkyl phosphorochloridate or phosphorochloridothioate corresponding to the formula:

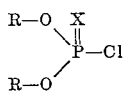

with an alkali metal salt of a 1-alkynylcycloalkanol corresponding to the formula:

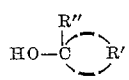

The reaction conveniently is carried out in an inert organic liquid such as benzene, carbon tetrachloride, methylene chloride and diethyl ether. The amounts of the reagents to be employed are not critical, some of the desired product being obtained when employing any proportion of the reagents. In the preferred method of operation, good results are obtained when employing substantially equimolecular proportions of the O,O-dialkyl phosphorochloridate or phosphorochloridothioate and alkali metal salt of the 1-alkynyl cycloalkanol. The reaction takes place smoothly at the temperature range of from 0° to 80° C. with the production of the desired product and chloride of reaction. This chloride appears in the reaction mixture as alkali metal chloride. In carrying out the reaction, the reactants are mixed and contacted together in any convenient fashion and the resulting mixture maintained for a period of time in the reaction temperature range to insure completion of the reaction. Following the reaction, the reaction mixture is filtered and the filtrate fractionally distilled under reduced pressure to remove low boiling constituents and obtain the desired product as a residue. This product may be purified by conventional procedures such as washing with dilute aqueous alkali metal hydroxide, washing with water and solvent extraction.

The following examples merely illustrate the invention and are not to be construed as limiting.

Example I.—O-(1-Ethynylcyclohexyl) O,O-Dimethyl Phosphorothioate

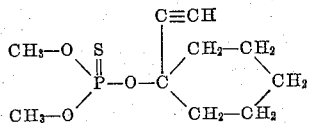

1-ethynylcyclohexanol (24.8 grams; 0.2 mole) is added portionwise to 4.6 grams (0.2 mole) of sodium dispersed in 250 milliliters of benzene to prepare the sodium salt of 1-ethynylcyclohexanol. The addition is carried out over a period of one hour and at a temperature of from 35° to 50° C. Following the addition, 32 grams (0.2 mole) of O,O-dimethyl phosphorochloridothioate is added portionwise with stirring to the above prepared benzene dispersion of the sodium salt derivative. The addition is carried out over a period of 2 hours and at a temperature of from 30° to 35° C. The reaction mixture is then filtered, the filtrate extracted with carbon bisulfide and the extract thereafter concentrated by distillation under reduced pressure at gradually increasing temperatures up to a temperature of 63° C. at 2 millimeters' pressure. As a result of these operations, there is obtained an O-(1-ethynylcyclohexyl) O,O-dimethyl phosphorothioate product as a residue. This product has a refractive index n/D of 1.533 at 25° C. and a sulfur content of 12.3 percent as compared to a theoretical content of 12.9 percent.

Example II.—O-(1-Ethynylcyclopentyl) O,O-Dimethyl Phosphate

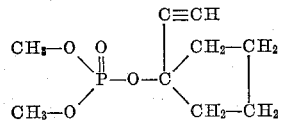

1-ethynylcyclopentanol (22 grams; 0.2 mole) is added portionwise with stirring to (4.6 grams; 0.2 mole) of sodium dispersed in 250 milliliters of benzene. The addition is carried out over a period of one hour and at a temperature of 35° to 45° C. to produce the sodium salt of 1-ethynylcyclopentanol. To this dispersion of the sodium salt derivative, is added with stirring to 28.9 grams (0.2 mole) of O,O-dimethyl phosphorochloridate. The addition is carried out portionwise at a temperature of from 10° to 20° C. and over a period of two hours. The reaction mixture is then filtered and the filtrate concentrated by distillation under reduced pressure at gradually increasing temperatures up to a temperature of 50° C. at 2 millimeters' pressure to obtain an O-(1-ethynylcyclopentyl) O,O-dimethyl phosphate product as a liquid residue having a phosphorus content of 14 percent and a molecular weight of 216.

Example III.—O-[1-(1'-Propynyl)-Cyclohexyl] O,O-Dimethyl Phosphorothioate

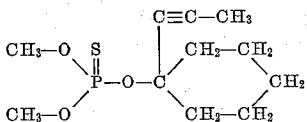

1-(1'-propynyl)-cyclohexanol (27.6 grams; 0.2 mole) is added portionwise with stirring to 4.6 grams (0.2 mole) of sodium dispersed in 250 milliliters of benzene to produce a dispersion of the sodium salt of 1-(1'-propynyl)-cyclohexanol. The addition is carried out over a period of 1.5 hours and at a temperature of 35° C. O,O-dimethyl phosphorochloridothioate (32 grams; 0.2 mole) is added portionwise with stirring to the above prepared dispersion containing the sodium salt derivative. The addition is carried out over a period of 2 hours and at a temperature of 30° to 35° C. The reaction mixture is then filtered and the reaction medium removed from the filtrate by fractional distillation under reduced pressure to obtain an O-[1-(1-propynyl)-cyclohexyl] O,O-dimethyl phosphorothioate product as a liquid residue having a molecular weight of 263 and a sulfur content of 12.

In a similar manner, other products of the present invention are prepared as follows:

O-(1-ethynylcyclopentyl) O,O-diamyl phosphorothioate (molecular weight 447; phosphorus content 8.9 percent) by reacting together the potassium salt of 1-ethynylcyclopentanol and O,O-diamyl phosphorochloridothioate.

O-[1-(1'-propynyl)-cyclohexyl] O,O-diethyl phosphate (molecular weight of 275; phosphorus content of 11) by reacting together the sodium salt of 1-(1'-propynyl)-cyclohexanol and O,O-diethyl phosphorochloridate.

O-[1-(1'-propynyl)-cyclopentyl] O,O-dimethyl phosphorothioate (molecular weight of 246; phosphorus content of 12.6) by reacting together 1-(1'-propynyl)-cyclopentanol and O,O-dimethyl phosphorochloridothioate.

O-(1-ethynylcyclohexyl) O-methyl O-butyl phosphate (molecular weight of 275; phosphorus content of 11.2) by reacting together the sodium salt of 1-ethynylcyclohexanol and O-methyl O-butyl phosphorochloridate.

O-[1-(1'-propynyl)-cyclopentyl] O-methyl O-ethyl phosphorothioate (molecular weight of 265; phosphorus content of 12) by reacting together the sodium salt of 1-(1'-propynyl)-cyclopentanol and O-methyl O-ethyl phosphorochloridothioate.

O-[1-(1'-propynyl)-cyclopentyl] O,O-dibutyl phosphate (molecular weight of 315; phosphorus content of 9.9) by reacting together the potassium salt of 1-(1'-propynyl)-cyclopentanol and O,O-dibutyl phosphorochloridate.

The novel compounds of the present invention are useful as herbicides and parasiticides for the control of a number of pests. For such uses, the products are dispersed on an inert finely divided solid such as chalk or talc or a finely divided solid surface active dispersing agent and the resulting products employed as dusts. Such mixtures may also be dispersed in water with or without the aid of a surface active agent and employed as sprays. In other procedures, the products are employed as active constituents in solvent solutions, oil-in-water or water-in-oil emulsions or aqueous dispersions. In representative operations, aqueous compositions containing 500 parts per million by weight of O-(1-ethynylcyclohexyl) O,O-dimethyl phosphorothioate give 100 percent controls of flies, Mexican bean beetles, mites and aphids.

The alkynylcycloalkanols employed as starting materials in accordance with the present teachings are prepared by known procedures wherein cyclohexanone or cyclopentanone is reacted with sodium acetylide or sodium methylacetylide to obtain the sodium salt of the desired alkynylcycloalkanol. The salt compound can be hydrolyzed with sulfuric acid to obtain the alkynylcycloalkanol.

I claim:

1. A compound corresponding to the formula

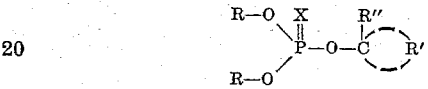

wherein each R represents lower alkyl, R' represents a polymethylene radical containing from 4 to 5 carbon atoms, inclusive, R'' represents a member of the group consisting of ethynyl and 1-propynyl and X represents a member of the group consisting of oxygen and sulfur.

2. O-(1-ethynylcyclohexyl) O,O-dimethyl phosphorothioate.

3. O-(1-ethynylcyclopentyl) O,O-dimethyl phosphate.

4. O[1-(1'-propynyl)-cyclohexyl] O,O-dimethyl phosphorothioate.

5. O-[1-(1'-propynyl)-cyclohexyl] O,O-diethyl phosphate.

6. O-[1-(1'-propynyl)-cyclopentyl] O,O-dimethyl phosphorothioate.

7. O-[1-(1'-propynyl)-cyclopentyl] O,O-dibutyl phosphate.

No references cited.